(12) United States Patent
Williamson et al.

(10) Patent No.: US 7,823,571 B2
(45) Date of Patent: Nov. 2, 2010

(54) DOG EXERCISING APPARATUS AND METHOD

(75) Inventors: Michael M. Williamson, Stateville, NC (US); Ward Myers, Wayzata, MN (US)

(73) Assignee: Hyper Products, Inc., Wayzata, MN (US)

( * ) Notice: Subject to any disclaimer, the term of this patent is extended or adjusted under 35 U.S.C. 154(b) by 1673 days.

(21) Appl. No.: 10/881,667

(22) Filed: Jun. 30, 2004

(65) Prior Publication Data

US 2005/0229910 A1 Oct. 20, 2005

Related U.S. Application Data

(60) Provisional application No. 60/562,656, filed on Apr. 15, 2004.

(51) Int. Cl.
*F41B 3/02* (2006.01)
(52) U.S. Cl. ..................... 124/20.1; 119/702
(58) Field of Classification Search ................ 124/20.1, 124/20.2, 20.3
See application file for complete search history.

(56) References Cited

U.S. PATENT DOCUMENTS

| 2,672,857 | A | * | 3/1954 | Gauthier ................. 124/20.1 |
| 4,583,513 | A | * | 4/1986 | Ellenburg et al. .......... 124/20.2 |
| 5,579,751 | A | * | 12/1996 | Lin ........................ 124/20.1 |
| 5,894,672 | A | * | 4/1999 | Ellenburg et al. ............ 33/265 |
| 6,595,160 | B1 | * | 7/2003 | Williamson ................ 119/702 |

* cited by examiner

*Primary Examiner*—John Ricci
(74) *Attorney, Agent, or Firm*—Z. Peter Sawicki; Westman, Champlin & Kelly, P.A.

(57) ABSTRACT

An apparatus for exercising a dog with an object includes a frame having a cage for retaining a plurality of objects. The frame also includes at least one prong extending away from the cage. The prong is attached to a pouch with a resilient member. The apparatus also includes a handle attached to the frame and a collapsible forearm brace pivotally attached to a base extending from the handle. The collapsible forearm brace is pivoted proximate the frame when in transport or in storage. The collapsible forearm brace extends from the base and into a rigid engagement therewith when in an operational configuration.

14 Claims, 4 Drawing Sheets

DOG EXERCISING APPARATUS AND METHOD

CROSS REFERENCE TO RELATED APPLICATION(S)

The present application claims priority from Provisional Application No. 60/562,656, filed on Apr. 15, 2004, which is hereby incorporated by reference in its entirety.

BACKGROUND OF THE INVENTION

The present invention relates to an apparatus and method for exercising a dog. More particularly, present invention relates to a hand held apparatus that propels an object for the dog to chase and retrieve.

Typically, an owner will exercise his/her dog by throwing an object, such as a tennis ball, for the dog to chase and retrieve. However, repeating the throwing motion may cause the thrower's arm to become fatigued and/or sore.

Additionally, a distance that the dog has to run to retrieve the ball is limited by the owner's throwing ability. If the owner cannot throw the ball a significant distance, the dog may not get the desired amount of exercise during the exercising time.

To overcome the issues associated with the owner having to throw the ball, some dog owner's have employed slings to propel balls for the dog to chase and retrieve. Slings allow the ball to be propelled a significant distance while not stressing or fatiguing the owner's arm. However, most of the slings are designed to use a single ball because of the inconvenience in carrying multiple balls to a park or a field where the dog is being exercised. Additionally, the ball has a tendency to become wet with dog saliva over time which makes touching or gripping the ball undesirable.

SUMMARY OF THE INVENTION

The present invention includes an apparatus for exercising a dog with an object. The apparatus includes a frame having a cage for retaining a plurality of objects. The frame also includes at least one prong extending away from the cage. The prong is attached to a pouch with a resilient member. The apparatus also includes a handle attached to the frame and a collapsible forearm brace pivotally attached to a base extending from the handle. The collapsible forearm brace is pivoted proximate the frame when in transport or in storage. The collapsible forearm brace extends from the base and into a rigid engagement therewith when in an operational configuration.

DETAILED DESCRIPTION OF THE PREFERRED EMBODIMENTS

Figure 1:
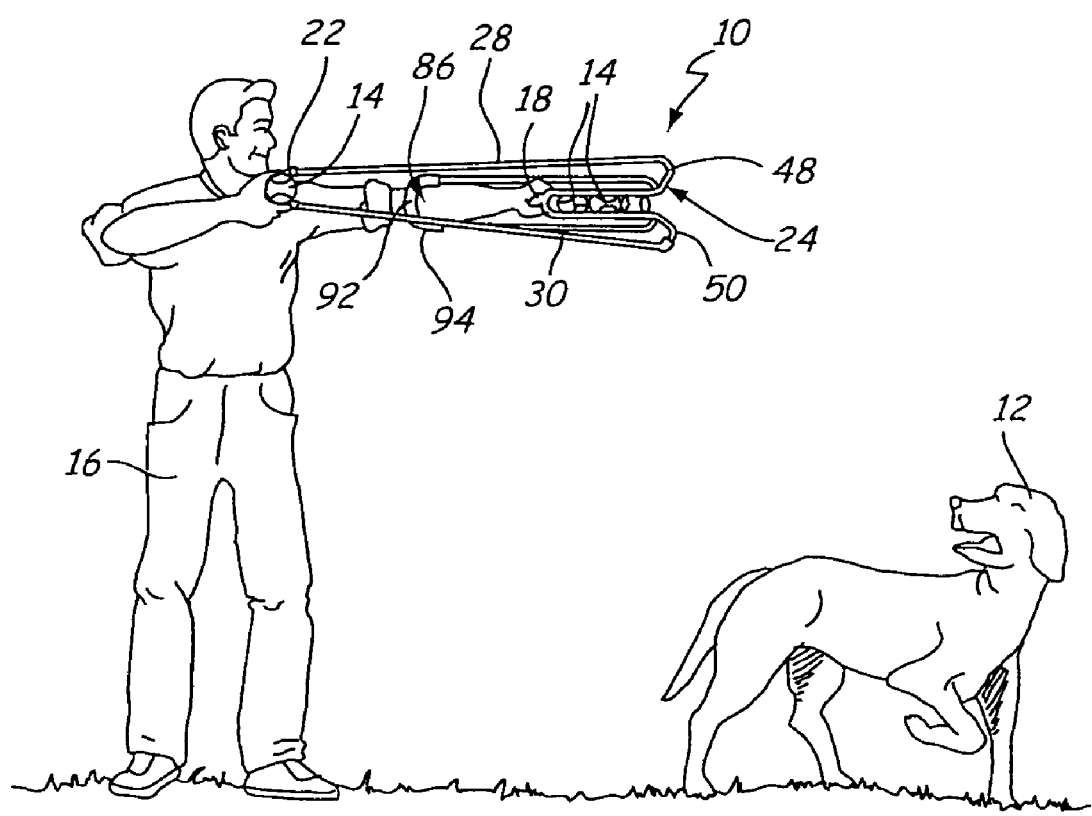
FIG. 1 is a perspective view of the dog exercising apparatus of the present invention in use.

An apparatus for exercising a dog is generally illustrated in FIG. 1 at 10. Throughout the Figures like elements will be referred to by like reference characters. The apparatus 10 is hand held and is used to propel a tennis ball 14 for a dog 12 or a plurality of dogs to chase and retrieve. The apparatus 10 allows an operator 16 to propel a plurality of tennis balls 14 a selected distance from a location without tiring or injuring the operator's arm caused by the repetitive motion required to repeatedly toss the tennis ball 14 for the dog 12 to chase and retrieve to achieve the desired amount of exercise.

Figure 2:
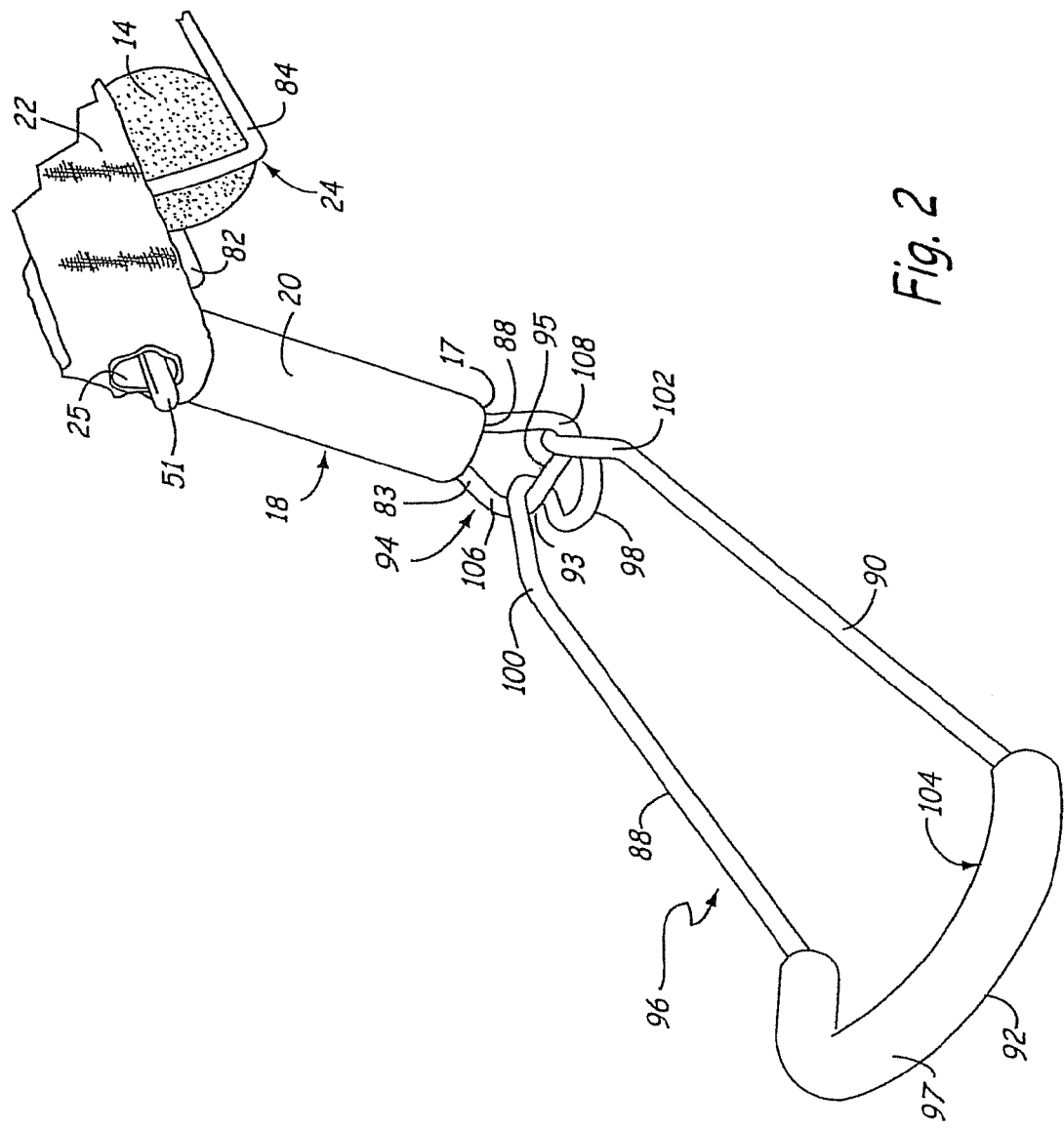
FIG. 2 is a partial perspective view of the dog exercising apparatus of the present invention wherein a forearm brace is extended into an operational position.
Figure 3:
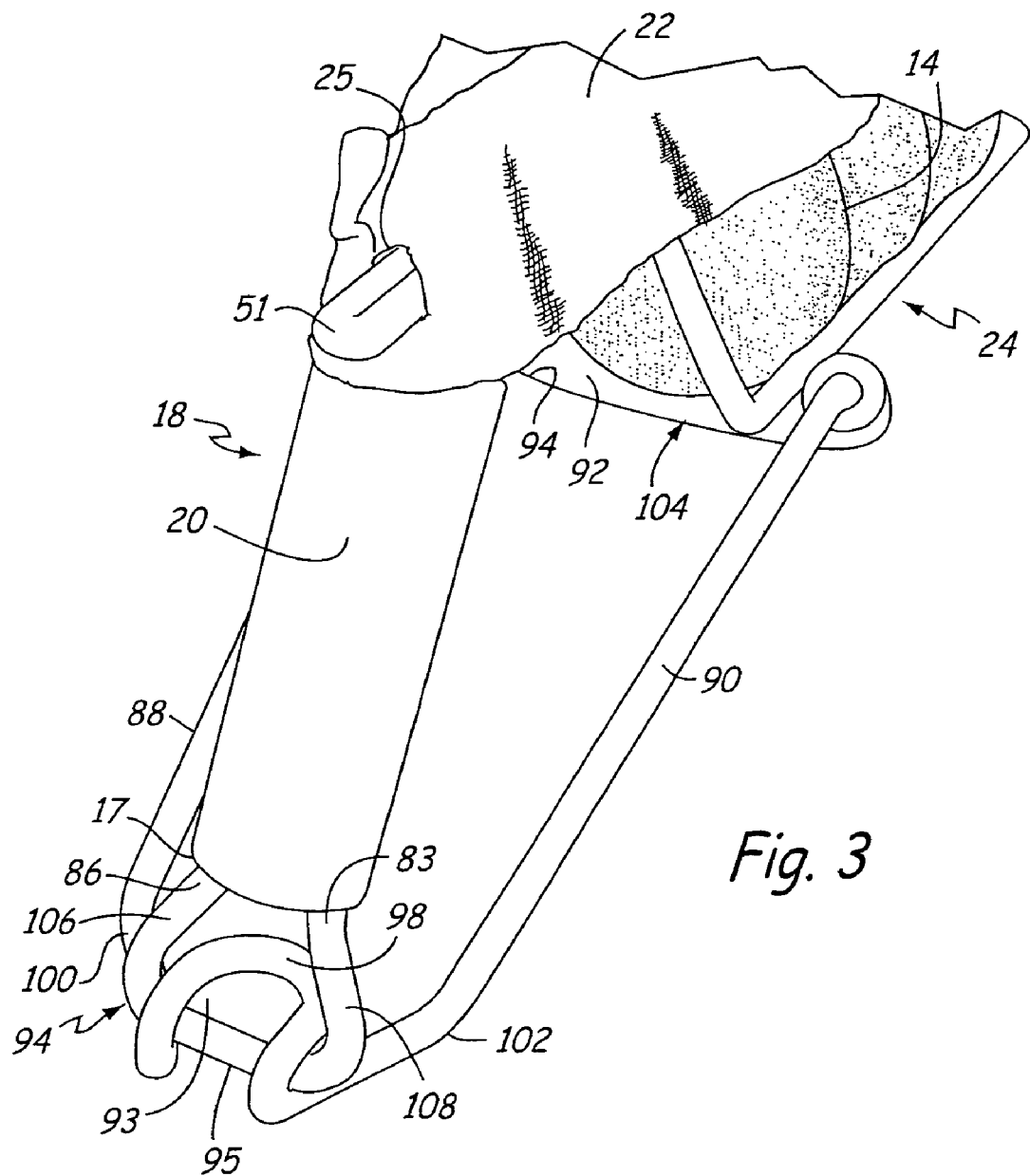
FIG. 3 is a partial perspective view of the dog exercising apparatus of the present invention wherein the forearm brace is collapsed into a storage and transportation position.
Figure 4:
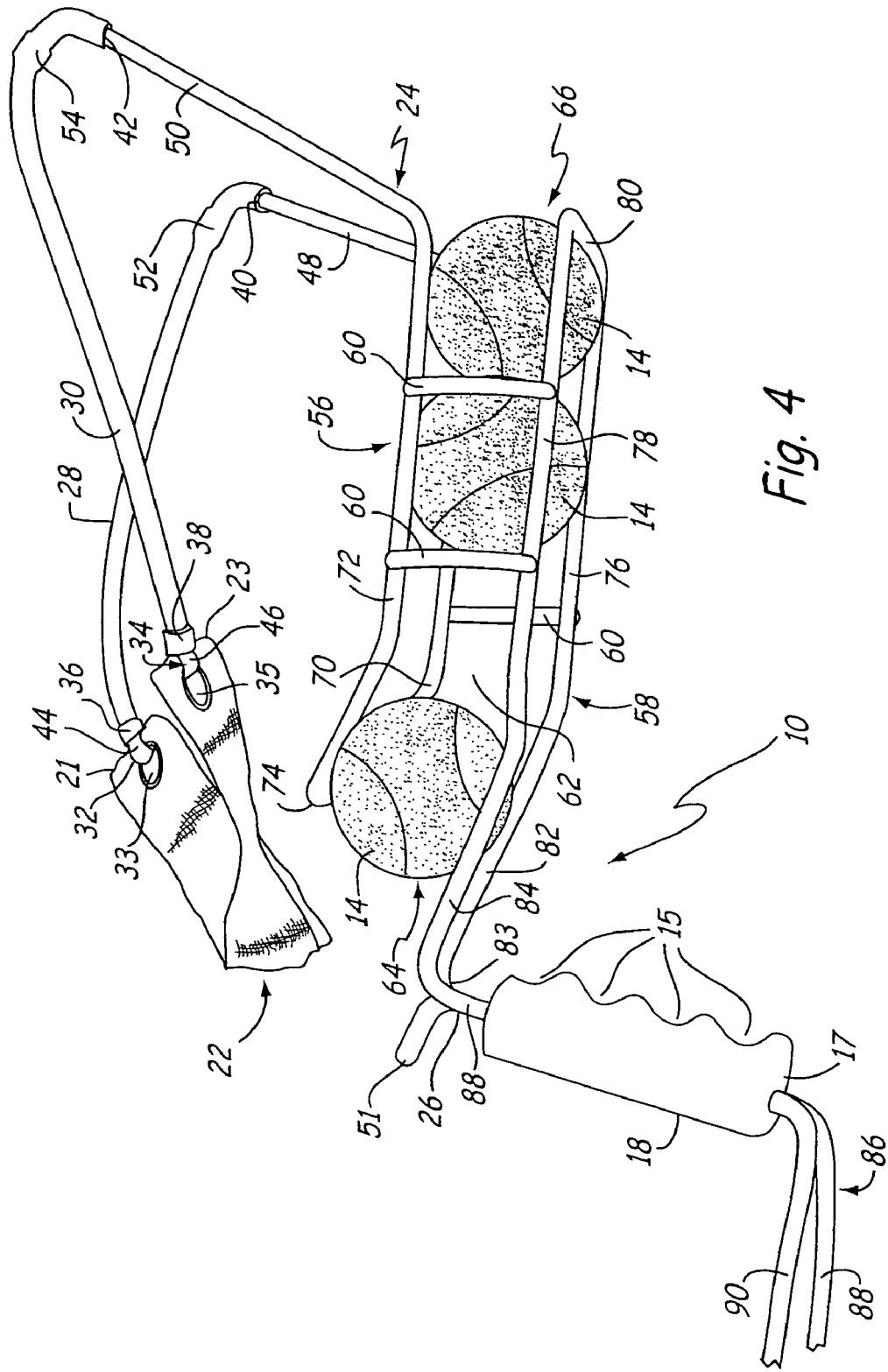
FIG. 4 is a perspective view of the dog exercising apparatus of the present invention.

Referring to FIGS. 1 and 4, the operator 16 grips a handle 18 of the apparatus 10 with one hand and positions the tennis ball 14 into a pouch 22 with the other hand. The handle 18 is preferably constructed from a polymeric material that is formed with indentions 15 that are in the form of a "pistol grip" to conform to the fingers of the operator's hand to provide a more secure grip on the handle 18. Referring to FIGS. 2 and 3, the handle 18 may also have a smooth cylindrical outer surface 20 that is gripped by the operator 16.

Referring back to FIGS. 1 and 4, the pouch 22 is connected to a frame 24 with left and right segments of surgical tubing 28, 30. Distal ends 32, 34 of the left and right segments of surgical tubing 28, 30 are fixedly secured to left and right ends 21, 23, respectively, of the pouch 22. Preferably, the distal ends 32, 34 include end loops 36, 38 that are positioned through left and right apertures 33, 35, respectively, in the pouch 22 through which proximal ends 40, 42 of the left and right segments of surgical tubing 28, 30 are inserted to form left and right securing loops 44, 46 about left and right ends 21, 23 of the pouch 22. By securing the pouch 22 to the left and right segments of surgical tubing 28, 30 with the left and right securing loops 44, 46 about the left and right ends 21, 23, all respectively, the connections between the pouch 22 and the left and right segments of surgical tubing 28, 30 are able to withstand a force created by stretching the left and right segments of surgical tubing 28, 30 with manual force placed upon the pouch 22.

Referring to FIGS. 2 and 3, the pouch 22 also includes a slot 25 that is positionable about a tab 51 extending from the proximal end 26 of the frame 24. Positioning the slot 25 of the pouch 22 about the tab 51 retains the pouch 22 in a selected position when the apparatus 10 is being stored or is being transported.

Referring back to FIGS. 1 and 4, the proximal ends 40, 42 of the left and right segments of surgical tubing 28, 30, respectively, are fixedly secured to left and right prongs 48, 50, respectively, of the frame 24. Preferably, the left and right segments of surgical tubing 28, 30 are constructed from commercially available surgical tubing having a bore (not shown) defined by a generally circular wall. The proximal ends 40, 42 are fixedly secured by either enlarging the bores (not shown) in the left and right segments of surgical tubing 28, 30 such that the proximal ends 40, 42 are disposed about portions of the left and right prongs 48, 50, respectively, or manually pulling the left and right segments of surgical tubing 28, 30 onto the left and right prongs 48, 50, respectively. With the proximal ends 40, 42 positioned a selected distance onto the left and right prongs 48, 50, respectively, the bore (not shown) contracts and creates a frictional engagement between the wall of the left and right segments of surgical tubing 28, 30 and the left and right prongs 48, 50, respectively. Although surgical tubing is the preferred material for connecting the pouch 22 to the frame 24, other stretchable, resilient materials are also within the scope of the present invention, including but not limited to, a rubber band, an elastic band and a compression spring.

The left and right prongs 48, 50 are preferably circular in cross-section, although other cross-sectional configurations are within the scope of the present invention. The left and right prongs 48, 50 include raised segments 52, 54, respectively, that engage the walls of the left and right segment of surgical tubing 28, 30 to create a stronger frictional engagement between the left and right segments of surgical tubing 28, 30 and the left and right prongs 48, 50, respectively. The raised segments 52, 54 prevent the left and right segments of surgical tubing 28, 30 from accidentally slipping off of the left and right prongs 48, 50, all respectively. The raised segments 52, 54 are preferably circular in cross-section, having a larger diameter than the diameter of the prongs 48, 50, although other cross-sectional configurations are within the scope of the present invention.

The frame 24 includes an upper portion 56 and a lower portion 58 that are separated by connecting rods 60. The upper portion 56, the lower portion 58 and the connection rods 60 define a cage 62 that accepts a plurality of tennis balls 14. While the tennis balls 14 freely move between a proximal end 64 and a distal end 66 of the cage 62, the proximal end 64 and the distal end 66 are constricted to prevent the tennis balls 14 from accidentally rolling out of the cage 62. While the proximal end 64 and the distal end 66 of the cage 62 are sufficiently constricted to prevent the tennis balls 14 from accidentally rolling out of the cage 62, the tennis balls 14 are positioned into and are removed from the cage 62 through either the proximal end 64 or the distal end 66 with manual force.

Preferably, the tennis balls 14 are positioned into the cage 62 through the constricted distal end 66 with either manual force or forcing the distal end toward the ground to collect the tennis ball. The tennis balls 14 are preferably removed from the cage 62 through the constricted proximal end 64. Being able to remove the tennis balls 14 through the constricted proximal end 66 of the cage 62 provides a more fluid motion of grabbing the tennis ball 14, positioning the tennis ball 14 in the pouch 22, gripping the tennis ball 14 through the pouch 22 and stretching the left and right segments of surgical tubing 28, 30 to propel the tennis ball 14. One skilled in the art will recognize that being able to position the tennis balls 14 into the cage 62 through the distal end 64 by forcing the distal end 64 towards the ball 14 and being able to remove the tennis ball 14 through the proximal end 66 with the pouch 22 allows the user to exercise the dog without having to physically touch the saliva covered tennis balls 14.

The upper portion 56 of the frame 24 is preferably constructed of a single length of a steel tube or a solid rod, preferably between ⅛ inch and ¼ inch in diameter. The upper portion 56 is generally U-shaped having generally parallel left and right sides 70, 72 that are separated by an arcuate portion 74. The arcuate portion 74 extends slightly upward from the generally parallel sides 70, 72 to provide the selected constriction of the proximal end 64 of the cage 62. The left and right prongs 48, 50 extend from the left and right sides 70, 72 respectively, to form a slightly obtuse angle, although any angle is within the scope of the present invention.

The lower portion 58 is also preferably constructed of a single length of a steel tube or steel rod, preferably between ⅛ inch and ¼ inch in diameter. The lower portion 58 includes left and right side portions 76, 78 that are generally parallel to each other and separated by a distal end portion 80 which is preferably substantially perpendicular to the left and right side portions 76, 78. Left and right proximal end portions 82, 84 extend from the left and right side portions 76, 78, respectively, and are bent slightly upward. The left and right proximal end portions 82, 84 taper toward each other to generally form a V shape where the narrowest distance between the left and right proximal end portions 82, 84 is proximate the handle 18. The left and right proximal end portions 82, 84 proximate the handle 18 bend substantially perpendicularly wherein the handle 18 is secured about left and right generally vertical portions 83, 85 during the molding process.

The connecting rods 60 are also preferably constructed of a steel tubing or a steel rod, preferably between ⅛ inch and ¼ inch in diameter and made of the same material as the upper portion 56 and the lower portion 58 of the frame 24. The connecting rods 60 are preferably welded to both the upper portion 56 and the lower portion 58 such that the connecting rods 60 do not cause a mechanical failure of the frame 24 during use.

One skilled in the art will recognize that the frame can be constructed of any material that provides structural strength and integrity to withstand the forces generated during use of the apparatus 10 over time. A failure of the frame 24 could result in an injury to the operator 16, therefore the material of construction of the frame 24 must be carefully considered to prevent the likelihood of injury.

The apparatus 10 preferably includes a forearm brace 86 extending from a bottom end 17 of the handle 18. The forearm brace 86 includes left and right side portions 88, 90 that are extensions from the left and right generally vertical portions 83, 85, respectively, and gradually spread apart. The left and right side portions 88, 90 of the forearm brace 86 are retained apart with an arcuate portion 92 that generally conforms to the profile of a forearm of the user as best illustrated in FIG. 1. Preferably, a padded or foam material 94 is secured about the arcuate portion 92 to reduce pressure on the forearm when the apparatus 10 is in use. When the apparatus 10 is in use, the forearm brace 86 provides stability to the user and relieves stresses and strain placed upon the operator's grip in the form of a torque when the left and right segments of surgical tubing 28, 30 are stretched and then released to propel the tennis ball 14.

The forearm brace 86 may be constructed of a single piece of material as illustrated in FIGS. 1 and 4, preferably from steel tubing or a solid rod between ⅛ inch and ¼ inch in diameter and made of the same material as the frame 24. However, the length of the apparatus 10 from the arcuate portion 92 of the forearm brace 86 to the left and right prongs 48, 50 may make the apparatus 10 difficult to store and transport to and from a place where the dog can exercise.

Alternatively, referring to FIGS. 2 and 3, the forearm brace 86 may be collapsible and when collapsed, reduces the length of the apparatus 10, making the apparatus 10 more easily stored and transported. The collapsible forearm brace 86 is constructed of a base 94 that is an extension of the left and right generally vertical portions 83, 85 that extend from the handle 18 and forms a generally triangular shaped loop 95 having a generally flat bottom portion 95 and generally slanted left and right side portions 106 and 108. A movable bracing portion 96 is pivotally secured to the base 94 to allow the forearm brace 86 to be extended when in use as illustrated in FIG. 2 and pivoted toward the frame 24 when being stored or transported as illustrated in FIG. 3.

The movable bracing portion 96 pivotally engages the base 94 by positioning a channel 93 proximate a proximal end 98 about the loop 95. The channel 93 is defined by the rounded proximal end 98 bent toward the arcuate portion 92 at the distal end of the movable bracing portion 96. The proximal end 98 is connected to the arcuate portion 92 with left and right side portions 88, 90 such that the collapsible forearm brace 86 has the same general configuration as the rigid forearm brace as illustrated in FIGS. 1 and 4.

In the operating position, the movable bracing portion is rigidly positioned relative to the base 94 by an engagement of the tapered left and right side portions 88, 90 proximate the proximal end 98 with upper leg portions 106, 108 of the generally triangularly shaped loop 95 of the base 94. Other engagements of the movable bracing portion 96 and the base 92 are also within the scope of the present invention provided that the movable bracing portion 96 is rigidly secured in the operating position when manual force is applied to the pouch 22 and the tennis ball 14.

A distance between the left and right side portions 88, 90 rapidly increases to points 100, 102 on the left and right side portions 88, 90, respectively. From points 100, 102 the distance between the left and right side portions 88, 90 increases at a more gradual rate to a distal end 104 where the arcuate portion 92, that is preferably covered with the padded material 97, retains the left and right side portions 88, 90 in the selected relationship with respect to each other.

In operation, the operator 16 pivots the movable bracing portion 96 from a collapsed position as illustrated in FIG. 3 to a rigid operating position as illustrated in FIG. 2. The movable bracing portion 96 is retained in the rigid operation position by the engagement of the tapered left and right side portions 88, 90 proximate the proximal end 98 with the upper leg portions 106, 108 of the generally triangularly shaped loop 95 of the base 94. The operator 16 positions one of his/her hands below the arcuate portion 92, between the left and right side portions 88, 90 and grips the handle 18. The operator 16 then extends his/her arm such that the arm is straight with the elbow locked as illustrated in FIG. 1.

The operator 16 retrieves a tennis ball 14, preferably from the proximal end 64 of the cage 62, and places the tennis ball 14 in the pouch 22 with his/her other hand. The operator 16 grips the tennis ball 14 through the pouch 22 and applies manual force to the pouch 22 and the tennis ball 14 by pulling the pouch 22 and the tennis ball 14 toward himself/herself while the other arm is extended and straight.

Manual force causes the left and right segments of surgical tubing 28, 30 to stretch. As the left and right segments of surgical tubing 28, 30 stretch, torque is placed upon the hand of the operator 16 gripping the handle 18 that is transferred to the operator's forearm by the forearm brace 86 in a vector generally perpendicular to a length of the forearm. The forearm is better able of withstanding the torque as a force that is exerted by the arcuate portion 92 onto the forearm than the operator's hand, which may fatigue over time. The padded material 94 about the arcuate portion 92 relieves some pressure that is exerted upon the forearm while the left and right segments of surgical tubing 28, 30 are stretched.

When the left and right segments of surgical tubing 28, 30 are stretched to a selected length, the operator 16 releases his/her grip on the pouch 22 and the tennis ball 14 such that the left and right segments of surgical tubing 28, 30 contract to a non-tension length. As the left and right segments of surgical tubing 28, 30 contract, the pouch 22 and the tennis ball 14 are rapidly propelled away from the operator 16. The left and right prongs 48, 50 stop the movement of the pouch 22 and the left and right segments of surgical tubing 28, 30 from being propelled from the apparatus 10. However, the tennis ball 14 continues to be propelled from the apparatus 10 a distance proportional to the length that the left and right segments 28, 30 were stretched. With the tennis ball 14 propelled from the apparatus 10, the dog 12 or many dogs get exercise by chasing and retrieving the tennis ball 14.

The left and right prongs 48, 50 and the proximal ends 82, 84 of the left and right sides 76, 78, respectively, of the bottom portion 58 of the frame 24 are designed to aid the frame 24 in withstanding the force created while the left and right segments of surgical tubing 28, 30 are being stretched. The left and right prongs 48, 50 extend away from the frame 24 and have spring qualities that allow the left and right prongs 48, 50 to flex in the direction of the manual force and thereby relieve stress upon the frame 24 generated by the manual force. The proximal ends 82, 84 of the left and right sides 76, 78, respectively, of the bottom portion 58 of the frame 24 are bent upward and resist the torque generated from the force applied to the prongs 48, 50 upon the frame 24 proximate the handle.

Because the cage 62 retains several tennis balls 14 between the constricted proximal and distal ends 64, 66, manual force can be applied to the tennis balls 14 to remove the tennis balls 14 from either the proximal end 64 or the distal end 66 of the cage 62. Employing the same procedure, another tennis ball 14 can be quickly propelled in a desired direction at a desired trajectory thereby allowing a single operator 16 to exercise the same dog 12 or many dogs at the same time.

Because the motion used to stretch the left and right segments of surgical tubing 28, 30 is relatively easy, the operator 16 will tire less quickly than if the operator 16 had to manually throw the tennis balls 14. Additionally, the apparatus 10 allows the operator 16 to consistently propel the tennis balls 14 farther than if the operator 16 had to throw the tennis balls.

Once the dog 12 or dogs have been sufficiently exercised the tennis balls 14 are manually forced into the cage 62 for storage through either the proximal end 64 or the distal end 66 of the cage 62. The operator 16 releases his/her grip on the handle 18 and removes his/her hand from the forearm brace 86. The operator collapses the movable brace portion 96 toward the frame 24 and optionally positions the slot 25 about the tab 51 to retain the pouch 22 in the selected position for transport and storage.

Although the present invention has been described with reference to preferred embodiments, workers skilled in the art will recognize that changes may be made in form and detail without departing from the spirit and scope of the invention.

What is claimed is:

1. An apparatus for exercising a dog with an object, the apparatus comprising:
   a frame comprising:
      a cage for retaining a plurality of objects; and
      at least one prong extending away from the cage;
   a pouch for gripping the object;
   at least one resilient member attaching the pouch to the prong;
   a handle attached to the frame;
   a base extending from the frame, the base comprising a generally triangular shaped configuration having a generally flat bottom portion and generally slanted left and right side portions; and
   a collapsible forearm brace comprising a channel proximate a proximal end wherein the channel is positioned about a generally flat bottom by the base such that the forearm brace is pivots there about wherein the forearm brace is pivoted proximate the frame when in transport or in storage and wherein the collapsible forearm brace extends from the base in a rigid engagement therewith when the apparatus is in use and wherein an upper portion of the channel engages the generally slanted left and right side portions to create the rigid engagement; and
   wherein the cage comprises a proximal end wherein the proximal end constricts such that manual force upon the object positions the object within the cage or removes the object from the cage depending upon the direction of the force.

2. The apparatus of claim 1 and wherein the frame further comprises left and right prongs attached to the cage.

3. The apparatus of claim 2 and further comprising:
a left resilient member attached to the left prong and a left end of the pouch; and
a right resilient member attached to the right prong and a right end of the pouch.

4. The apparatus of claim 3 and wherein the left and right resilient members comprise surgical tubing.

5. The apparatus of claim 1 and wherein the base comprises a portion of the frame.

6. A method of exercising a dog with an object without physically touching an object that becomes wet with dog saliva over time, the method comprising:
gripping a handle of an apparatus comprising:
a cage extending from the handle and wherein the cage retains a plurality of objects, the cage having a constricted proximal end and a constricted distal end;
left and right prongs extending from the distal end of the cage;
a pouch for gripping the object; and
left and right resilient members attaching the pouch to the left and right prongs;
positioning the pouch about an object proximal the proximate end of the cage;
applying manual force to the object through the pouch to remove the object from the proximal end of the cage;
stretching the left and right resilient members with manual force by applying manual force to the object while gripping the object through the pouch;
releasing the manual force from the object by releasing the grip on the pouch such that the resilient members propel the object for the dog to chase and retrieve;
positioning the distal end of the cage proximate the retrieved object positioned on the ground; and
applying manual force to the apparatus such that the object is positioned into the cage through the distal end without having to physically touch the object.

7. The method of claim 6 and further comprising extending a collapsible forearm brace into a rigid position prior to gripping the handle.

8. The method of claim 7 and further comprising positioning the users hand through the extended forearm brace prior to gripping the handle.

9. The method of claim 6 and further comprising repeating the method of exercising a dog until the dog is sufficiently exercised without having to physically touch the object used to exercise the dog.

10. An apparatus for exercising a dog with an object, the apparatus comprising:
a frame comprising:
a cage for retaining a plurality of objects; and
at least one prong extending away from the cage;
a pouch for gripping the object;
at least one resilient member attaching the pouch to the prong;
a handle attached to the frame;
a base extending from the frame, the base comprising a generally triangular shaped configuration having a generally flat bottom portion and generally slanted left and right side portions; and
a collapsible forearm brace comprising a channel proximate a proximal end wherein the channel is positioned about the generally flat bottom portion of the base such that the forearm brace is pivots there about wherein the forearm brace is pivoted proximate the frame when in transport or in storage and wherein the collapsible forearm brace extends from the base in a rigid engagement therewith when the apparatus is in use and wherein an upper portion of the channel engages the generally slanted left and right side portions to create the rigid engagement; and
wherein the cage comprises a distal end wherein the distal end constricts such that manual force upon the object positions the object within the cage or removes the object from the cage depending upon the direction of the force.

11. The apparatus of claim 10 and wherein the frame further comprises left and right prongs attached to the cage.

12. The apparatus of claim 11 and further comprising:
a left resilient member attached to the left prong and a left end of the pouch; and
a right resilient member attached to the right prong and a right end of the pouch.

13. The apparatus of claim 12 and wherein the left and right resilient members comprise surgical tubing.

14. An apparatus for exercising a dog with an object, the apparatus comprising:
a frame comprising:
a cage for retaining a plurality of objects; and
at least one prong extending away from the cage;
a pouch for gripping the object;
at least one resilient member attaching the pouch to the prong;
a handle attached to the frame;
a base; and
a collapsible forearm brace comprising a channel proximate a proximal end wherein the channel is positioned about the generally flat bottom portion of the base such that the forearm brace is pivots there about wherein the forearm brace is pivoted proximate the frame when in transport or in storage and wherein the collapsible forearm brace extends from the base in a rigid engagement therewith when the apparatus is in use and wherein an upper portion of the channel engages the generally slanted left and right side portions to create the rigid engagement; and
wherein the base comprises a generally triangular shaped configuration having a generally flat bottom portion and generally slanted left and right side portions.

* * * * *